Jan. 14, 1964  J. R. BROOKS  3,117,442
MOISTURE INDICATING DEVICE
Filed May 20, 1960  3 Sheets-Sheet 1

INVENTOR
Jerry R. Brooks
BY *Cecil L. Wood*
ATTORNEY

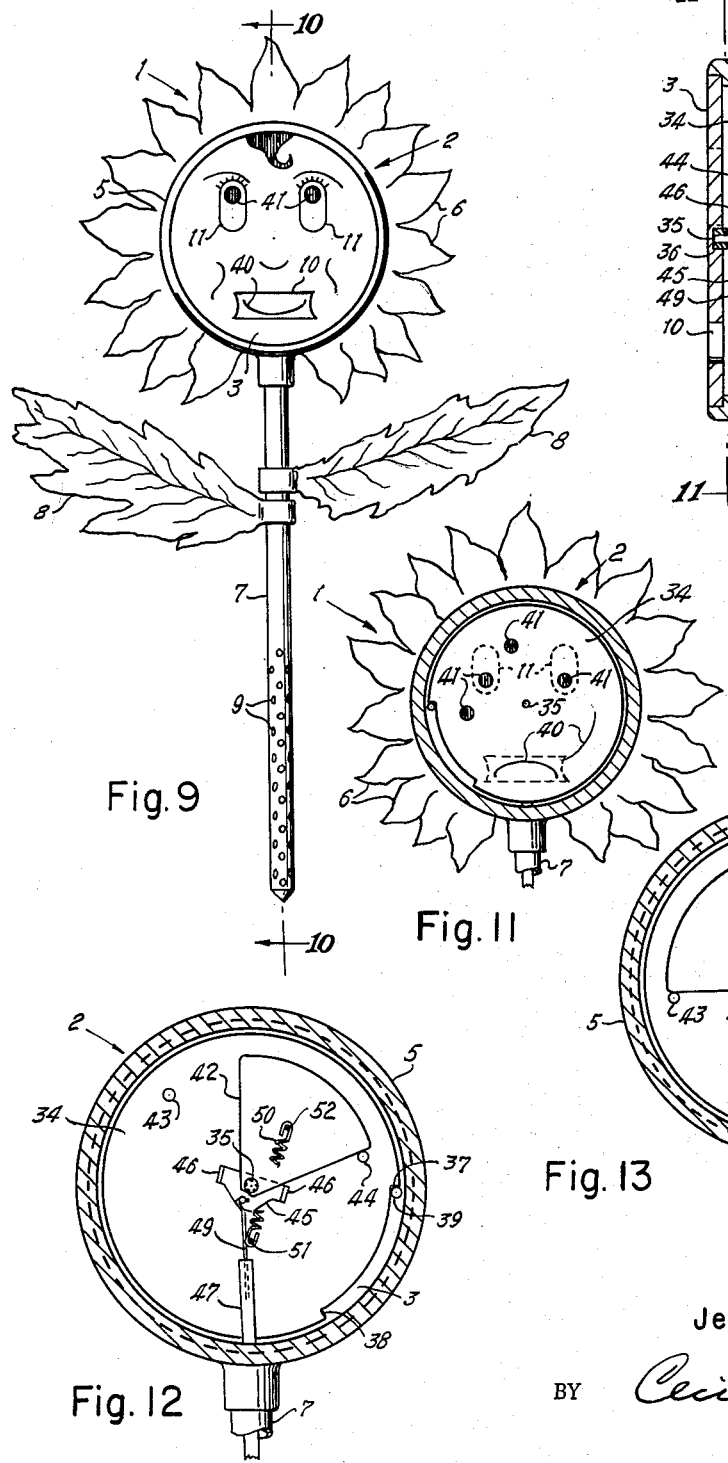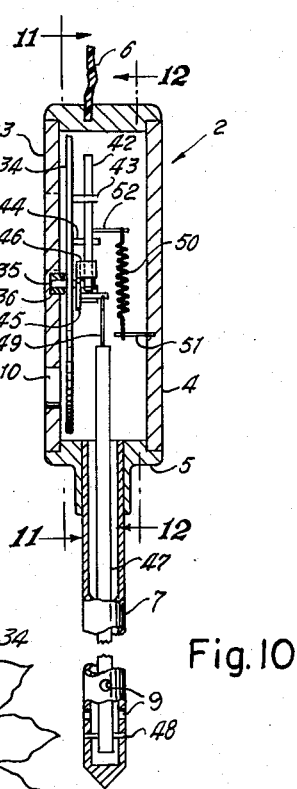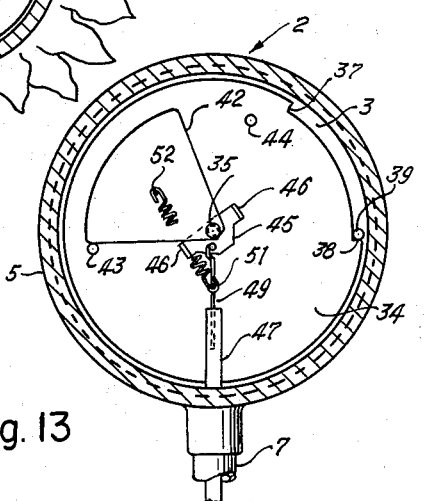

Jan. 14, 1964     J. R. BROOKS     3,117,442
MOISTURE INDICATING DEVICE
Filed May 20, 1960     3 Sheets-Sheet 3
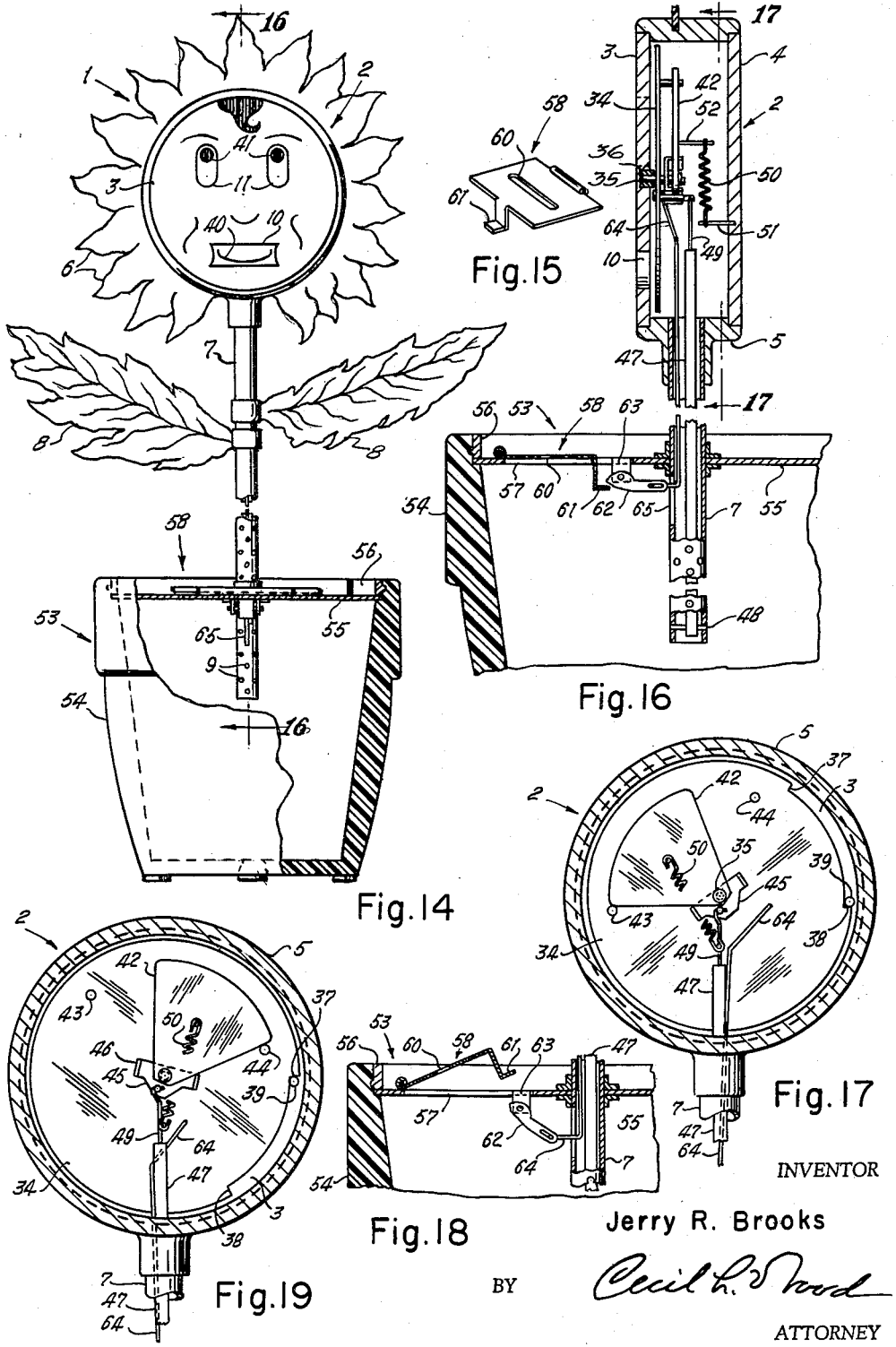
INVENTOR
Jerry R. Brooks United States Patent Office 3,117,442
Patented Jan. 14, 1964

3,117,442
MOISTURE INDICATING DEVICE
Jerry R. Brooks, 1716 Merrywood Way,
Gainesville, Tex.
Filed May 20, 1960, Ser. No. 30,481
3 Claims. (Cl. 73—73)

This invention relates to a moisture indicating device, and it concerns more particularly a moisture indicating device which includes, as an essential feature thereof, a moisture sensitive element which is characterized by its expansion and contraction in response to the presence of moisture.

The invention contemplates a moisture indicating device comprising a sign simulating a flower, such as a sun flower, daisy, or the like, having a substantially circular housing including a front plate corresponding to a central portion of the flower, and having an elongated tube simulating a stem connected at one end to the peripheral surface of the housing and forming an extension thereof, the front plate having a representation of a human face superimposed thereon, and having cut out portions in positions corresponding to the positions of the mouth and eyes, respectively, a movable plate bearing representations of at least one mouth and at least one pair of eyes adjustably positioned within the housing, behind the front plate, in juxtaposed relation to the front plate and movable slidably relative thereto to thereby shift the positions of the mouth and eyes, respectively, relative to the openings of the front plate from first positions, in which the face appears to be smiling, to second positions in which the face is unsmiling, a moisture sensitive element in the housing characterized by its expansion and contraction in response to the presence of moisture, and linkage operatively connected to the moisture sensitive element and acting on the movable plate whereby the presence of moisture is reflected by the position of the movable plate relative to the front plate of the housing.

In one form thereof the invention contemplates a moisture indicating device as described which is adapted for use in indicating the moisture content of a body of soil contained in a flower pot, box, or bed.

In another form thereof the invention contemplates a moisture indicating device as described which is adapted for use in indicating the humidity of the atmosphere.

In still another form thereof the invention contemplates a coin bank having a closure device including a latch therefor, and having incorporated therein a moisture indicating device as described acting on the latch whereby the latch is releasable in response to the humidity of the atmosphere.

Another object of the invention resides in the provision of a device of the character described which affords an attractive and novel medium for diffusing aromatic substances into the atmosphere for purifying or deodorizing the air, and providing a means whereby a supply of liquid material can be contained therein and means indicating the presence or lack of the material in such container.

The invention will be readily understood by referring to the following description and the accompanying drawing, in which:

FIGURE 9 is a front elevational view showing a modified form of the invention;

FIGURE 10 is a sectional elevational view taken on the line 10—10 of FIGURE 9;

FIGURE 11 is a fragmentary sectional elevational view taken on the line 11—11 of FIGURE 10;

FIGURE 12 is a fragmentary sectional elevational view taken on the line 12—12 of FIGURE 10;

FIGURE 13 is a view similar to that of FIGURE 12, showing the parts in different relative positions;

FIGURE 14 is a front elevational view, partly broken away, showing another form of the invention;

FIGURE 15 is a perspective view of one of the parts;

FIGURE 16 is a fragmentary sectional elevational view taken on the line 16—16 of FIGURE 14;

FIGURE 17 is a fragmentary sectional elevational view taken on the line 17—17 of FIGURE 16;

FIGURE 18 is a view similar to that of FIGURE 16, showing the parts in different relative positions; and FIGURE 19 is a view similar to that of FIGURE 17, showing the parts in different relative positions.

Figure 1:
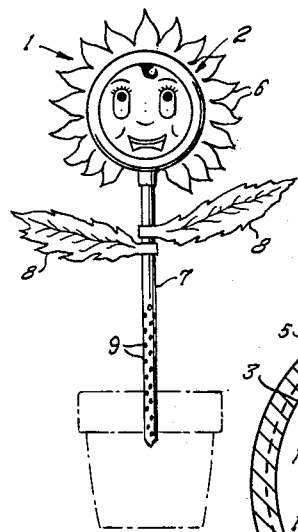
FIGURE 1 is a front elevational view of a moisture indicating device embodying the invention, showing the simulated face thereof in its smiling position, indicating the presence or absence of moisture, as desired.

Referring to the form of the invention shown in FIGURES 1 to 8 of the drawing, the moisture indicating device of the invention comprises a sign, designated generally by the numeral 1, which simulates a flower, such as a sun flower, daisy, or the like.

The sign 1 has a substantially circular housing, indicated generally by the numeral 2, which includes a front plate 3, a back plate 4, and a peripheral wall 5.

The housing 2 corresponds to a central portion of the flower simulated by the sign 1. A plurality of petal simulating elements 6 are spaced circumferentially relative to the housing 2, and extend radially outwardly from the peripheral wall 5 thereof, to which they are attached.

An elongated, normally vertically disposed tube 7, which simulates a stem, is connected at one end to the peripheral wall 5 of the housing 2 and extends radially outwardly therefrom. The tube communicates with the interior of the housing 2, and forms an extension thereof. A plurality of leaf simulating elements 8 are attached to the tube 7 and extend horizontally outwardly therefrom.

The tube 7 is preforated as at 9 beginning at its lower end, which is closed. In one form of the invention the tube 7 may be inserted below the surface of a body of soil contained in a pot, box, or bed, such as the pot shown in dotted lines in FIGURE 1, whereby the device of the invention may be used to indicate the moisture content of the soil.

In another form of the invention, as shown particularly in FIGURES 14, 16 and 18, the structure is adapted for use as an air purifier or deodorizer, as by the diffusing of aromatic substances from a container which also serves as a base therefor. This arrangement will be presently described.

The front plate 3 has a representation of a human face superimposed thereon, and has cut out portions 10 and 11 in positions corresponding to the positions of the mouth and eyes, respectively.

The cut out portion 10, which is in a position corresponding to the position of the mouth, is in the form of a horizontally extending slot, the upper and lower edges of which are curved downwardly and upwardly, respectively, toward the middle thereof.

The cut out portions 11, which are in positions corresponding to the positions of the eyes, are in the form of vertically extending slots having rounded ends.

A movable plate 12 is adjustably positioned within the housing 2, behind the front plate 3 and in juxtaposed relation thereto. The movable plate 12 is movable slidably, in a direction parallel to the longitudinal axis of the tube 7, relative to the front plate 3.

The movable plate 12 has straight, parallel side edges which slidably engage channels 13 therefor on the back side of the front plate 3, whereby the movable plate 12 is movable slidably, in a vertical direction, relative to the front plate 3.

The lower edge of the movable plate 12 is curved downwardly toward the middle thereof, and is curved about the same radius as the upper edge of the cut out portion 10 of the front plate 3. The lower edge of the movable plate 12 is visible below the upper edge of the cut out portion 10, and simulates a mouth which is turned upwardly at its sides, in the uppermost position of the movable plate 12 relative to the front plate 3, as shown in FIGURE 1.

The movable plate 12 has a cut out portion 14 positioned centrally thereof. The cut out portion 14 is in the form of an inverted T consisting of a horizontally extending slot 15, which is positioned a short distance above the curved lower edge of the movable plate 12, and a vertically extending slot 16, which intersects the horizontally extending slot 15 and extends upwardly therefrom, along the center line of the movable plate 12, to a point near the upper edge thereof.

Figure 2:
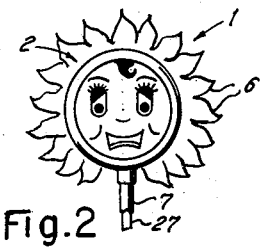
FIGURE 2 is a fragmentary front elevational view of the moisture indicating device illustrated in FIGURE 1, showing the face in its unsmiling position.
Figure 3:
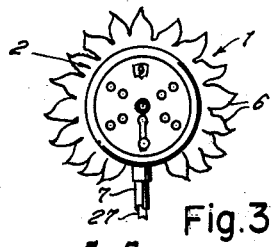
FIGURE 3 is a fragmentary rear elevational view.
Figure 5:
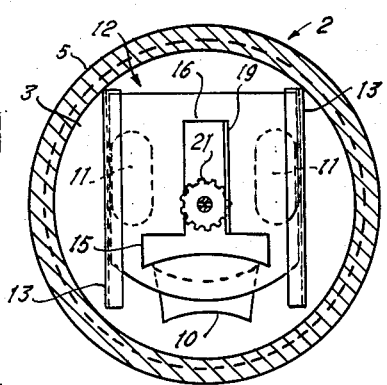
FIGURE 5 is a sectional elevational view taken on the line 5—5 of FIGURE 4.
Figure 4:
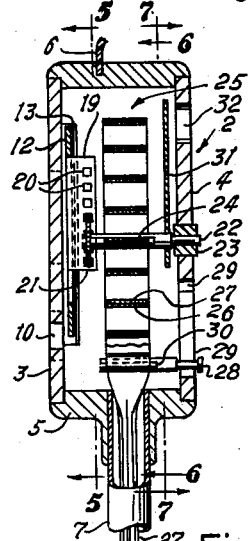
FIGURE 4 is a fragmentary sectional elevational view, on an enlarged scale, taken on a median line.
Figure 6:
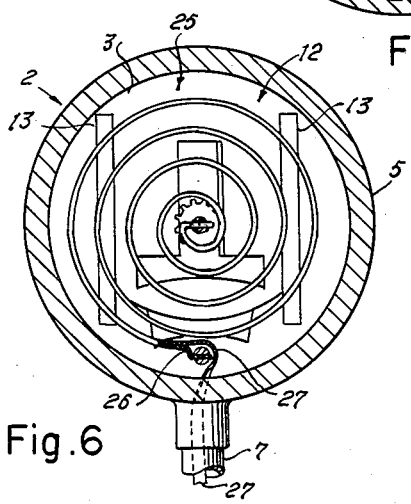
FIGURE 6 is a sectional elevational view taken on the line 6—6 of FIGURE 4.

The lower edge of the horizontally extending slot 15 is curved upwardly toward the middle thereof, and is curved about the same radius as the lower edge of the cut portion 10 of the front plate 3. The lower edge of the horizontally extending slot 15 is visible above the lower edge of the cut out portion 10, and simulates a mouth which is turned downwardly at its sides, in the lowermost position of the movable plate 12 relative to the front plate 3, as shown in FIGURE 2.

The movable plate 12 bears a representation of a pair of eyes 17 in association with a pair of eyebrows 18, which are positioned above them. The eyes 17 alone are visible through the cut out portions 11 of the front plate 3 in the uppermost position of the movable plate 12 relative to the front plate 3, as shown in FIGURE 1, in which position the eyes 17 are positioned adjacent the upper limits of the cut out portions 11. In the lowermost position of the movable plate 12 relative to the front plate 3, as shown in FIGURE 2, the eyes 17 are lowered and the eyebrows 18 are visible through the cut out portions 11 also.

A right angular flange 19, which is formed on the back side of the front plate 3, adjacent one side of the vertically extending slot 16, has vertically spaced indentations 20 therein whereby it is operable as a rack bar, engageable with a pinion gear 21, whereby the movable plate 12 is adapted to be raised or lowered relative to the front plate 3 upon rotation of the pinion gear 21.

The pinion gear 21 is mounted on one end of a rotatable shaft 22, and turns therewith. The shaft 22 is positioned centrally of the housing 2, and the end thereof opposite the pinion gear 21 is journaled in a bearing 23 therefor carried by the back plate 4.

The shaft 22 has a longitudinal slot 24 therein, beginning at the end thereof on which the pinion gear 21 is mounted. The slotted end of the shaft 22 is passed through an opening therefor in the center of the pinion gear 21.

A laminated strip 25, which consists of an outer strip 26 formed of metal, such as relatively thin shim stock, having an inner strip 27 formed of an absorbent material, such as blotting paper, or the like, bonded thereto and characterized by its response to the presence of moisture is coiled about the shaft 22 and has its inner end passed through the longitudinal slot 24 thereof, the inner strip 27 tending to straighten out thus causing the shaft 22 to rotate. Conversely, when the strip 27 is dry the shaft 22 is rotated in an opposite direction.

A pin 28 is arranged parallel to the shaft 22, eccentrically of the housing 2, and has one of its ends passed through a vertically extending slot 29 therefor in the back plate 4, below the shaft 22. The pin 28 is movable rotatively about its axis, and is movable vertically relative to the slot 29.

The pin 28 has a longitudinal slot 30 therein, beginning at the end thereof opposite the slot 29. The outer end of the outer strip 26 only is passed through the longitudinal slot 20 of the pin 28, whereby it is anchored to the pin 28, while the inner strip 27 extends downwardly below the pin 28 and through the tube 7 to a point near its lower end. This structure is adapted for use with some type of liquid air purifying or odorizing agent.

The lower end of the inner strip 27 acts as a wick, whereby moisture admitted to the lower end of the tube 7 is uniformly distributed throughout the length of the inner strip 27, acting on the coil to rotate the shaft 22 and the pinion gear 21, whereby the movable plate 12 is raised or lowered relative to the front plate 3, depending on the position of the flange 19, which is operable as a rack bar, relative to the pinion gear 21.

The direction of movement of the movable plate 12 may be reversed by placing the flange 19 on the opposite side of the vertically extending slot 16, whereby it is engageable with the opposite side of the pinion gear 21.

A semi-circular plate 31, which is rigidly connected to the shaft 22 and extends radially outwardly therefrom, has a scale thereon, a portion of which is visible through a window 32 in the back plate 4. The presence of moisture is reflected by the position of the scale relative to the window 32.

Figure 7:
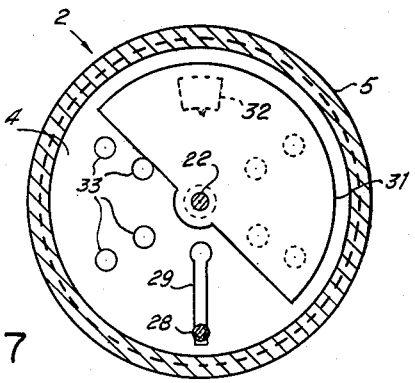
FIGURE 7 is a sectional elevational view taken on the line 7—7 of FIGURE 4.
Figure 8:
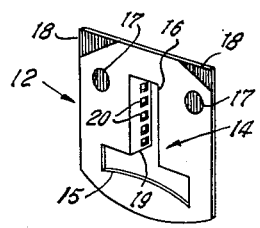
FIGURE 8 is a perspective view of one of the parts.

The back plate 4 has a plurality of perforations 33, as shown in FIGURE 7, providing inlets for the atmospheric air into the presence of the coil 25 whereby the plate 12 is moved relative to the front plate 3 of the invention to indicate the presence or lack of moisture in the air. The perforations 33 also provide outlet for vaporized air purifying or deodorizing agents contained in the base which will be presently described.

Referring to the form of the invention shown in FIGURES 9 to 13, the horizontally extending slot which comprises the cut out portion 10 of the front plate 3 has straight upper and lower edges.

A disc 34, which corresponds to the movable plate 12 shown in FIGURES 1 to 8, freely mounted on a shaft 35, is journaled at one end in a bearing 36 therefor carried by the front plate 3. A pair of circumferentially spaced shoulders 37 and 38, which are formed on the peripheral surface of the disc 34, are engageable with a pin 39 carried by the front plate 3, whereby rotative movement of the disc 34 in opposite directions is limited. The coil 25 may be employed in the operation of this structure when attached directly to the shaft 35 in the manner shown in FIGURES 4 and 6.

The disc 34 has representations of two separate mouths 40 and two separate pairs of eyes 41 which are adapted to register with the cut out portions 10 and 11, respectively, of the front plate 3 in different rotative positions of the disc 34 as determined by abutment of one or the other of the shoulders 37 and 38 against the pin 39.

A segmental plate 42, which serves as a weight, is rotatably mounted on the shaft 35, behind the disc 34, and extends radially outwardly therefrom. A pair of pins 43 and 44, which are carried by the disc 34, limit rotative movement of the segmental plate 42 in opposite directions relative to the disc 34.

A lever 45, which is rigidly connected intermediate its ends to the shaft 35, has abutments 46 on opposite ends thereof for engagement with opposite edges of the segmental plate 42, whereby the segmental plate 42 is adapted to be rocked about the shaft 35 upon movement of the lever 45 in either direction, to change the incidence of the mouth and eyes 40 and 41 by moving the plate 34.

A rod 47, which is formed of absorbent material, such as nylon or Orlon, characterized by its expansion and contraction in response to the presence of moisture, is disposed partly within the tube 7 and extends upwardly therefrom. The lower end of the rod 47 is secured in the tube 7, adjacent its lower end by means of a transverse pin 48, which is received in aligned openings therefor in the rod 47 and the tube 7.

A link 49, which is connected to the upper end of the rod 47 and extends upwardly therefrom, is pivotally connected at its upper end to the lever 45, whereby expansion or contraction of the rod 47 results in limited pivotal movement of the lever 45, which in turn causes the segmental plate 42 to be rocked about the shaft 35.

As the segmental plate 42 is swung upwardly across the center of the housing 2, and falls abruptly on the opposite side thereof, it engages one or the other of the pins 43 and 44, whereby the disc 34 is abruptly rotated with the segmental plate 42.

A tension spring 50, which is connected at its ends to pins 51 and 52 carried by the back plate 4 and the segmental plate 42, resists upward movement of the segmental plate 42 about the shaft 35, and accelerates its downward movement, whereby the rotative movement of the disc 34, in response to the action of the segmental plate 42, is characterized by its abruptness.

Referring to the form of the invention shown in FIGURES 14 to 19, the numeral 53 designates generally a coin bank, which is in the form of a simulated flower pot 54 having a removable cover consisting of a flat disc 55 which is engageable with an upwardly facing internal shoulder formed on the inner wall of the pot 54 and is secured in place by a split ring 56. The split ring 56 has a peripheral tongue which is engageable with a groove therefor in the inner periphery of the pot 54.

The disc 55 has a substantially rectangular opening 57 therein which is normally closed by a hinged cover 58 having a coin slot 60 therein. The hinged cover 58 has a depending tab 61 on the side thereof opposite its hinge for engagement by a latch member 62, which is pivotally connected to a depending tab 63 attached to the disc 55 adjacent the opening 57 thereof. The latch member 62 is adapted to releasably engage the tab 61 of the hinged cover 58, in one position thereof, whereby the hinged cover 58 is secured in its closed position.

A moisture indicating device substantially as shown in FIGURES 9 to 13, above described, has its tube 7 inserted in an opening therefor in the disc 55, centrally thereof, and is rigidly secured thereto, whereby the pot 54 forms a base for the moisture indicating device.

A link 64, which extends through the tube 7 and has its lower end passed through a side opening 65 in the tube 7, below the disc 55, is connected at its lower end to the latch member 62 and at its upper end to the disc 34, whereby the latch member 62 is adapted to be released in response to rotative movement of the disc 34.

The invention may be modified in various ways without departing from the spirit and scope thereof.

What is claimed is:

1. A moisture indicating device having a circular housing including a front plate having openings therein, and having an elongated tubular stem connected at one end to the periphery of the housing and forming an extension thereof, a movable plate bearing indicia adjustably positioned within the housing behind the front plate and movable relative thereto to thereby shift the positions of the indicia, respectively, relative to the openings of the front plate from one position to another, a moisture sensitive element, characterized by its expansion and contraction in response to the presence of moisture, secured concentrically of said stem and extending into said housing, a linkage operatively connected to the moisture sensitive element and acting on the movable plate whereby the presence of moisture is reflected by the position of the movable plate relative to the front plate of the housing, a closed container having a top opening therein normally closed by a hinged cover, a latch member disposed within the container and releasably engaging the cover, the tubular stem being passed through an opening therefor in the top of the container and extending upwardly therefrom whereby it provides a support for the housing, and linkage extending through the tubular stem and acting on the latch member in response to the action of the first mentioned linkage.

2. A moisture indicating device comprising, a circular housing having openings in the front face thereof, and having a tubular supporting stem adapted to be inserted in soil, a moisture sensing element secured concentrically of said stem and extending into said housing, a discular plate oscillatingly supported in said housing behind said front face thereof and having sets of indicia imprinted thereon adapted to register in said openings when said discular plate is oscillated, a lever rigidly attached to said discular plate and pivotal therewith and a linkage connecting the upper end of said sensing element to said lever, a weight pivoted on said lever and adapted to be oscillated thereby to alternate inclined positions when said moisture sensing element is longitudinally expanded and contracted to oscillate said discular plate, the said lever having stop means thereon to limit the rotation of said weight, spring means biasing said weight to its respective inclined positions, and means limiting the movement of said weight and said discular plate.

3. In a moisture indicating device having a circular housing having front and back closures, and having a plurality of symmetrically arranged openings in the front closure of said housing, a tubular stem on said housing for supporting the same, a moisture sensing element secured concentrically of said stem and extending into said housing, a discular plate pivotally supported in said housing behind said front closure and having indicia thereon adapted to register in the openings in said closure when said discular plate is oscillated on its pivot, a lever secured to said discular plate and adapted to be moved to opposite inclined positions whereby to partially rotate said discular plate, a linkage attached at one end to the upper end of said sensing element and having its opposite end attached to said lever concentrically of the pivot thereof for operating said lever, spring means biasing said lever and said discular plate to said opposite inclined positions, and means limiting the movement of said discular plate to said inclined positions.

References Cited in the file of this patent

UNITED STATES PATENTS

| 2,105,683 | Burdict | Jan. 18, 1938 |
| 2,929,241 | Gebhart | Mar. 22, 1960 |

FOREIGN PATENTS

| 481,616 | Canada | Mar. 11, 1952 |